(No Model.)
J. H. STEVENS, Jr.
SET WASHBASIN AND VALVE OPERATING MECHANISM THEREFOR.
No. 526,508. Patented Sept. 25, 1894.
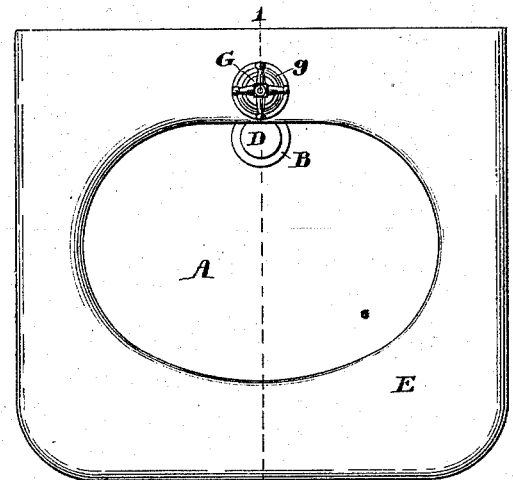
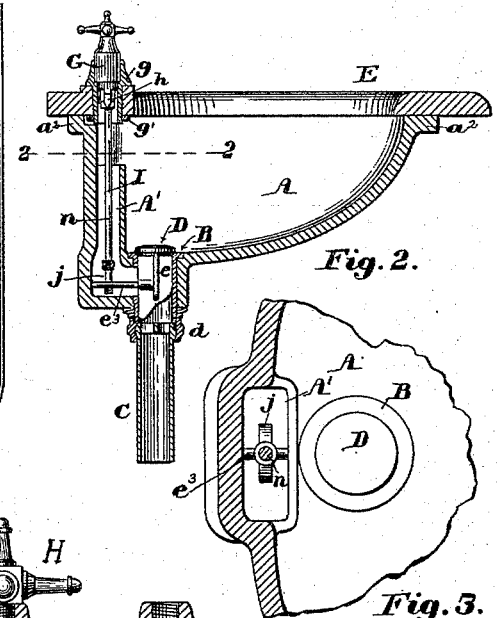
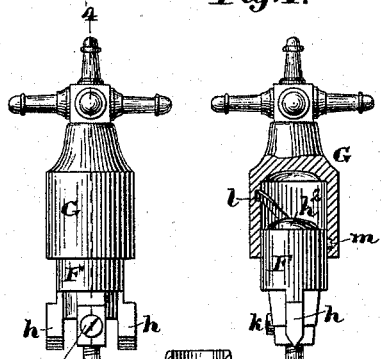
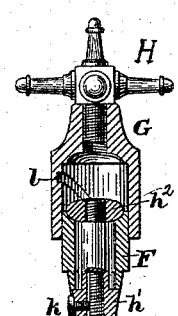
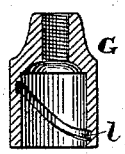
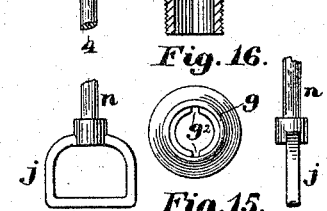
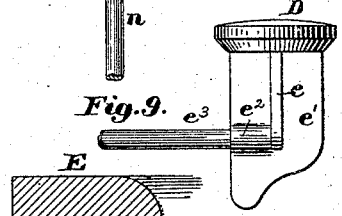
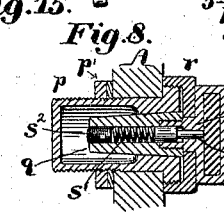
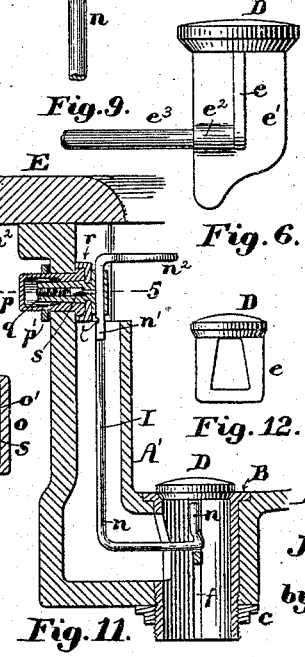
Witnesses:
Walter E. Lombard.
Andrew R. Newton.
Inventor:
John H. Stevens, Jr.,
by N. C. Lombard
Attorney.

UNITED STATES PATENT OFFICE.

JOHN H. STEVENS, JR., OF CAMBRIDGE, MASSACHUSETTS.

SET WASHBASIN AND VALVE-OPERATING MECHANISM THEREFOR.

SPECIFICATION forming part of Letters Patent No. 526,508, dated September 25, 1894.

Application filed April 4, 1894. Serial No. 506,273. (No model.)

*To all whom it may concern:*

Be it known that I, JOHN H. STEVENS, Jr., of Cambridge, in the county of Middlesex and State of Massachusetts, have invented certain new and useful Improvements in Set Washbasins and Valve-Operating Mechanism Therefor, of which the following, taken in connection with the accompanying drawings, is a specification.

My invention relates to set wash basins and valve operating mechanism therefor and it consists in certain novel features of construction, arrangement and combination of parts which will be readily understood by reference to the description of the accompanying drawings and to the claims hereto appended and in which my invention is clearly pointed out.

Figure 1 of the drawings is a plan of a set wash basin embodying my invention. Fig. 2 is a vertical section through the same on line 1 1 on Fig. 1. Fig. 3 is a partial horizontal section on line 2, 2, on Fig. 2. Fig. 4 is a central vertical section of the discharge pipe and its clamping nut drawn to an enlarged scale. Fig. 5 is a horizontal section of the same on line 3, 3, on Fig. 4. Fig. 6 is a side elevation of the valve for closing the discharge orifice. Fig. 7, is a front elevation of the valve lifting devices. Fig. 8 is an elevation viewed from a position at right angles to Fig. 7 with a portion of the cam cylinder cut in section on line 4, 4, on Fig. 7. Fig. 9 is a sectional elevation of the upper portion of the same parts, the cutting plane being through the cam cylinder, the stud carrying cylinder, and a portion of the ball carrying coupling on line 4, 4, on Fig. 7. Fig. 10 is a central vertical section of cam cylinder detached from the other parts. Fig. 11 is a partial vertical section through the basin illustrating a modification of the valve lifting devices and the valve. Fig. 12 is a front elevation of the valve adapted to said modification. Fig. 13 is a section on line 5, 5, on Fig. 11 enlarged. Fig. 14 is a rear elevation of the upper portion of the valve lifter shown in Fig. 11. Figs. 15 and 16 are respectively a plan and a central vertical section of the bushing set in the marble slab to serve as a bearing for the valve lifting mechanism.

In the drawings A is the basin which may be made oval, circular or rectangular in plan, and has its rear wall or a portion thereof substantially vertical and its bottom slightly inclined toward the rear, a rearwardly and downwardly projecting enlargement, a discharge opening through its bottom near its rear wall and through the downwardly projecting portion of said enlargement and an overflow passage A', the vertical portion of which is partly within said rearward extension and partly within the oval, circular or other inner perimeter of the basin as viewed in plan and extends from a point a short distance below the top of said basin, to a point below the bottom of the basin, from which point it extends horizontally into and communicates with the discharge passage through the bottom of the basin, all made in one piece of earthenware.

The opening through the bottom of the basin has fitted thereto the bushing B, provided at its upper end with the conical valve seat $a$, and having cut through its wall the opening $b$, said bushing having its lower end portion threaded and is secured in position in said basin by the nut $c$, and has the pipe C connected thereto by the coupling ring $d$ as shown in Fig. 2.

D is a valve for closing the discharge opening through the bushing B, fitted to the seat $a$ and provided with two pairs of wings $e$ and $e'$ extending downward therefrom into the bushing B, the wings $e$ fitting into and being guided by the grooves $f, f$, in the inner surface of the bushing and on opposite sides thereof while the wings $e'$ are guided by the inner surface of said bushing without any groove to receive them. The rear wing $e'$ is made longer than the front one, so it shall have a bearing against said bushing below the opening $b$ when said valve is raised to the extreme of its upward movement by being acted upon by the lifting device, and said rib has formed thereon the boss $e^2$ in which is set the laterally projecting rod or arm $e^3$ as shown in Figs. 2 and 6.

The basin A has formed around its upper portion an outwardly projecting flange $a^2$ by which and suitable screws or bolts it is secured to the under side of the marble slab E which may be supported on brackets or a wooden case as may be preferred. The opening through the slab E is somewhat smaller than the interior of the basin so that said slab projects over the chamber of the basin at the rear to a point directly over or slightly to the front of the basin side of the wall that separates the overflow passage A' from the basin proper.

The slab E has set in an opening therein, directly above the overflow passage A', a metal bushing $g$ which is firmly clamped thereto by the binding nut $g'$. The bushing $g$ has a circular opening through it, the upper portion of which is bored out to a larger diameter than the lower portion, and said lower portion has formed therein two vertical grooves $g^2$ arranged on opposite sides thereof as shown in Figs. 15, and 16.

F is a cylinder having an exterior diameter corresponding to the inner diameter of the lower portion of the bore of the bushing $g$ in which it is fitted so as to be movable vertically therein, and provided at its lower end with the arms $h, h$, which fit into the grooves $g^2$ of said bushing to prevent said cylinder F being turned about its axis in said bushing.

Within the cylinder F is suspended from the upper end thereof the internally threaded coupling $h'$ provided at its upper end with the ovally shaped head $h^2$ which rests in a concave bearing in the upper end of the cylinder F as shown in Fig. 9. The coupling $h'$ has screwed therein the rod $i$ to the opposite end of which is secured the stirrup $j$, the threaded upper portion of said rod having one side cut away to form a flat surface parallel to the side of said stirrup, against which flat surface the set screw $k$ impinges to clamp said rod in the coupling $h'$ when properly adjusted therein in such a manner that the stirrup $j$ shall always be parallel to a vertical plane drawn through the centers of the arms $h, h$, and at right angles to the rod or arm $e^3$ of the valve D as shown in Figs. 2, 3, 7, 8, and 9.

The upper portion of the bushing $g$ has fitted thereto so as to be revoluble and movable vertically therein, the cam cylinder G having its upper end closed and provided with the handle H for operating the same, and having formed in the inner surface of its cylindrical wall a cam path $l$ extending around the same from near the lower end of the bore of said cam cylinder on one side to near the top of said bore on the other side and thence back to near the bottom again, with which the stud $m$ set in the cylinder F engages in such a manner that a semi rotation of the cylinder G, in either direction, will cause the cylinder F, the rod $i$, stirrup $j$, and the valve D to be raised to the extreme of their upward movements, and a continuation of said rotary motion either in the same or opposite direction will cause the same parts to descend again. The valve D may also be raised by simply lifting upon the handle without rotating it, and no harm will result therefrom, the force of gravity reseating the valve again as soon as the handle is released. Although it is designed to be operated by simply rotating the handle without lifting it at all, if a person unfamiliar with the operation should lift the handle the valve would be raised and the water discharged from the basin without loss of time.

The valve D can be readily removed when desired for cleaning or other purposes without disconnecting or disturbing the lifting devices, by lifting the valve vertically till the rod $e^3$ comes in contact with the top of the opening $b$ in the bushing B and then tipping the valve obliquely toward the back of the basin until the round lower corner of the front wing $e'$ passes above the valve seat, and the reverse operation will insert the valve in position again and insure the rod $e$ passing through the opening of the stirrup $j$ in position to be acted upon thereby to lift the valve.

In Figs. 11, 12, 13, and 14 is illustrated a modification of my invention in which the lifting mechanism and the valve as well as the discharge and overflow passages bear the same general relation to each other, that is, the overflow passage being at the rear of the discharge passage, the lifting mechanism being at the rear of the valve and within the overflow passage, but instead of the valve being provided with the laterally projecting rod $e^3$ the lifting rod $n$ has its lower portion bent at right angles to its main body or into a horizontal position and a shorter portion is bent upward at right angles to the horizontal portion so that its end will, when lifted, come in contact with, and act upon, the under surface of the valve at its center, the wing of said valve having an opening cut through it as shown in Fig. 12, to permit the lifter $n$ to reach the center of said valve, as shown in Figs. 11 and 12.

The lifter I is made of a wire or rod $n$, a rectangular plate $n'$, and the lifter pad $n^2$ all connected together to form practically one piece.

The lifter I is constructed of such a length and so mounted that the pad $n^2$ is below the slab E when in its raised position, and the plate $n'$ is fitted to a rectangular bearing $o$ secured to the basin A in a fixed position in the following manner:

The basin A has an opening formed in its back wall just above the mouth of the overflow passage A' in which is fitted the metal socket $p$ and clamped therein so as to make a water tight joint by means of the clamping nut $p'$ and suitable packing. The socket $p$ has a rectangular and tapered mouth to receive the tapered plug $q$ made rectangular in cross section and having a cylindrical hole extending longitudinally through the same as shown.

The bearing $o$ has formed upon its back side a circular hub $o'$ upon which is loosely fitted so as to be revoluble thereon the cup like nut $r$ to engage a male thread on the flange of the socket $p$ to hold said bearing in position, said nut $r$ being secured on the hub $o'$ by the rectangular plug $q$ which is screwed upon said hub against a shoulder thereon as shown in Fig. 13. Within the bore of the plug $q$ is placed the locking pin $s$ which projects through a hole in the hub $o'$ and bears against the rear face of the plate $n'$ toward which it is pressed by the spring $s'$ placed in the bore of the plug $q$ between the pin $s$ and the screw plug $s^2$ as shown in Fig. 13. The rear face of the plate $n'$ has formed therein a transverse groove $t$, with which the end of the pin $s$ engages when the lifter is raised, to hold it in said raised position until the tension of the spring $s'$ is overcome by pressing upon the pad $n$.

The portion of the lifter I which acts upon the under side of the valve extends into the opening cut through the wing of the valve, so that the valve cannot be thrown entirely out of the discharge passage by any sudden movement of the lifter.

The bushing $g$ and the stirrup $j$ are made of such relative size that the latter may be drawn through the former when the valve D has been removed.

What I claim as new, and desire to secure by Letters Patent of the United States, is—

1. A set wash basin or other liquid holding receptacle having a substantially vertical rear wall and a bottom inclined toward the rear, a discharge opening through its bottom at the rear; an overflow passage formed in said rear wall but located within said rear wall; a valve fitted to and movable vertically in the mouth of said discharge passage when it communicates with the interior of the bowl; a vertically movable lifter located in said overflow passage and engaging, by its lower end, said valve, without being secured thereto, so that an upward movement of the lifter-rod will cause a corresponding upward movement of said valve.

2. The combination of a receptacle having an upright rear wall and an inclined bottom, a discharge passage through the bottom of said receptacle; an overflow passage at the rear of said discharge passage; a valve fitted to and guided vertically by said discharge passage and provided with a laterally projecting arm formed integral with or rigidly secured to said valve, and extending into said overflow passage; a vertically movable lifter located within said overflow passage and provided at its lower end with a stirrup to receive and engage said laterally projecting arm of said valve, without being positively connected thereto.

3. The combination of the discharge pipe or bushing B provided with the seat $a$ and the vertical grooves $f, f$; the valve D provided with the wings $e$ and $e'$ and the arm $e^3$ fitted to said seat and grooves; the bushing $g$ set in the slab E; the revoluble cam cylinder G provided with the path $l$; a handle for rotating said cam cylinder; the vertically movable and non revoluble cylinder F provided with the stud $m$ to engage said path; the pendent coupling $h'$; the vertically adjustable rod $i$ and the stirrup $j$ all constructed and operating substantially as described.

4. The combination of a vertically movable valve; a vertically movable lifter constructed and arranged to engage said valve and move it vertically in unison therewith; the coupling $h'$ provided with the oval head $h^2$; the cylinder F provided with the arms $h$, a curved seat at its upper end to receive said oval head $h^2$ and the stud $m$; the cam cylinder F provided with the path $l$ and the handle H; and the bushing $g$ provided with the vertical grooves $g^2$ to receive the arms $h$ as and for the purposes described.

5. The combination with a receptacle having a substantially vertical rear wall, and a bottom inclined toward the rear, a discharge opening through its bottom at the rear, and an overflow passage formed in said rear wall; of the metal bushing B provided with the seat $a$ and the vertical grooves $f, f$; the valve D provided with the wings $e, e$, and the arm $e^3$; the lifter rod $n$; and the stirrup $j$, all constructed, arranged and operating substantially as described, for the purpose specified.

6. In combination with a washbasin or other liquid holding receptacle having an upright rear wall, an inclined bottom a discharge passage through said bottom a valve seat and vertical guide ways formed in said discharge passage, an overflow passage at the rear of said discharge passage and connected thereto at its lower end by a horizontal opening; a valve fitted to and movable vertically in said vertical guide ways of said discharge passage; a valve lifter located in said overflow passage and constructed and arranged to be moved vertically therein and to engage, by its lower end, said valve, and lift it bodily therewith without being connected thereto or having its lower end confined by guides or bearings whereby the valve and the lifter can be readily removed for cleaning.

In testimony whereof I have signed my name to this specification, in the presence of two subscribing witnesses, on this 2d day of April, A. D. 1894.

JOHN H. STEVENS, JR.

Witnesses:
  N. C. LOMBARD,
  WALTER E. LOMBARD.